(12) United States Patent
Shi et al.

(10) Patent No.: US 10,938,669 B2
(45) Date of Patent: *Mar. 2, 2021

(54) INTELLIGENT INFORMATION ADAPTER GENERATION FOR SERVICE MANAGEMENT

(71) Applicant: INTERNATIONAL BUSINESS MACHINES CORPORATION, Armonk, NY (US)

(72) Inventors: Hui Q. Shi, Beijing (CN); Wei Wang, Beijing (CN); Yi B. Wang, Beijing (CN); Yuan Yuan, Beijing (CN); Ya P. Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,804

(22) Filed: Jul. 23, 2019

(65) Prior Publication Data
US 2019/0349267 A1  Nov. 14, 2019

Related U.S. Application Data

(63) Continuation of application No. 15/472,731, filed on Mar. 29, 2017, now Pat. No. 10,581,696.

(51) Int. Cl.
*H04L 12/24* (2006.01)
(52) U.S. Cl.
CPC .................. *H04L 41/20* (2013.01)
(58) Field of Classification Search
CPC .......... H04L 67/16; H04L 67/36; H04L 41/20
See application file for complete search history.

(56) References Cited

U.S. PATENT DOCUMENTS 8,745,397 B2   6/2014  Letca et al.
8,843,618 B2   9/2014  Li
(Continued)

FOREIGN PATENT DOCUMENTS

CN  104521182 A   4/2015
WO  2012021330 A2  2/2012

OTHER PUBLICATIONS

Office Action in U.S. Appl. No. 15/472,731 dated Mar. 4, 2019, 10 pgs.

(Continued)

*Primary Examiner* — Abdullahi E Salad
(74) *Attorney, Agent, or Firm* — Michael O'Keefe; Matthew M. Hulihan; Heslin Rothenberg Farley & Mesiti PC

(57) ABSTRACT

Intelligent information adapter generation for service management. Managing selection of adapters from and adapter pool to use for collecting the service management information includes, based on adding a data source, selecting an adapter to use for collecting service management information from the added data source, the selecting including automatically creating and selecting a new adapter, the new adapter being created based on access information to access the added data source, a resource type of the portion of service management information collected from the added data source, and a desired performance indicator that the new adapter is to parse out from the portion of service management information that the new adapter collects.

20 Claims, 12 Drawing Sheets

(56) References Cited

U.S. PATENT DOCUMENTS

| | | | |
|---|---|---|---|
| 8,935,201 B1 | 1/2015 | Fisher et al. | |
| 8,955,091 B2 | 2/2015 | Kailash et al. | |
| 9,342,357 B2 | 5/2016 | Grueneberg et al. | |
| 9,369,530 B2* | 6/2016 | Shankar | H04L 67/141 |
| 2007/0028247 A1* | 2/2007 | Rodriguez | G06F 9/541 |
| | | | 719/328 |
| 2012/0311157 A1 | 12/2012 | Erickson et al. | |
| 2014/0019628 A1* | 1/2014 | Shankar | G06F 9/541 |
| | | | 709/228 |
| 2014/0047099 A1 | 2/2014 | Flores et al. | |
| 2014/0372638 A1* | 12/2014 | Anderson | G06F 13/385 |
| | | | 710/62 |
| 2015/0046524 A1 | 2/2015 | O'Farrell et al. | |
| 2015/0304240 A1* | 10/2015 | Mandaleeka | G06F 9/5072 |
| | | | 709/226 |
| 2016/0182326 A1* | 6/2016 | Bhasin | H04L 43/0817 |
| | | | 709/224 |
| 2016/0232042 A1* | 8/2016 | Ritter | G06F 8/10 |
| 2018/0288169 A1 | 10/2018 | Shi et al. | |

OTHER PUBLICATIONS

Notice of Allowance in U.S. Appl. No. 15/472,731 dated Jun. 24, 2019, 8 pgs.

List of IBM Patents or Applications Treated as Related, Jul. 23, 2019, 2 pgs.

Baumgartner, Johannes, "Cloud Adapters for ORACLE Service Cloud (Rightnow Cloud 12.1.3)—Released", https://blogs.oracle.com/imc/entry/cloud_adapters_for_oracle_service, ORACLE, Nov. 30, 2014, 6 pgs.

Abstract of "An Architecture Model of Management and Monitoring on Cloud Services Resources." Yuanhui Sun et al. Published in: 2010 3rd International Conference on Advanced Computer Theory and Engineering (ICACTE) (vol. 3 ) Date of Conference: Aug. 20-22, 2010.

Mell, Peter, et al., "The NIST Definition of Cloud Computing", NIST Special Publication 800-145, Sep. 2011, Gaithersburg, MD, 7 pgs.

\* cited by examiner

INTELLIGENT INFORMATION ADAPTER GENERATION FOR SERVICE MANAGEMENT

BACKGROUND

To better manage cloud service platforms and other computing environments, cloud service providers rely on many kinds of service management information, such as power supply system data, cooling system data, hardware configuration data, hypervisor layer data, virtual machine data, operating system data, middleware data, application data, and user data, as examples. Current popular approaches leverage separate tools and/or systems to obtain each of these pieces of information. Consequently, the cloud platform administrator is required to install, configure, and maintain each of these different tools. However, it can be difficult for a cloud platform administrator to integrate related tools and/or systems to obtain all of the desired information in a manner that is practically workable, in order to fulfill the requirements of cloud service management. It is difficult also, using current methods, to adapt new data sources with the developments of a cloud platform if the cloud service provider desires new information to fulfill new service requirements.

SUMMARY

Shortcomings of the prior art are overcome and additional advantages are provided through the provision of a computer-implemented method. The method includes maintaining an adapter pool of adapters configured for collecting and parsing service management information provided by data sources. The method also includes performing, based on detecting that a data source has been added to a computing platform: creating a new adapter based on access information to access the added data source, a resource type of the service management information to collect from the added data source, and a desired indicator that the new adapter is to parse out from the service management information collected from the added data source. Further, based on detecting that the data source has been added to a computing platform, the method adds the new adapter to the adapter pool, and automatically selects the new adapter from the adapter pool to use for collecting the service management information from the added data source.

Further, a computer program product including a computer readable storage medium readable by a processing circuit and storing instructions for execution by the processing circuit is provided for performing a method. The method includes maintaining an adapter pool of adapters configured for collecting and parsing service management information provided by data sources. The method also includes performing, based on detecting that a data source has been added to a computing platform: creating a new adapter based on access information to access the added data source, a resource type of the service management information to collect from the added data source, and a desired indicator that the new adapter is to parse out from the service management information collected from the added data source. Further, based on detecting that the data source has been added to a computing platform, the method adds the new adapter to the adapter pool, and automatically selects the new adapter from the adapter pool to use for collecting the service management information from the added data source.

Yet further, a computer system is provided that includes a memory and a processor in communication with the memory. The computer system is configured to perform a method. The method includes maintaining an adapter pool of adapters configured for collecting and parsing service management information provided by data sources. The method also includes performing, based on detecting that a data source has been added to a computing platform: creating a new adapter based on access information to access the added data source, a resource type of the service management information to collect from the added data source, and a desired indicator that the new adapter is to parse out from the service management information collected from the added data source. Further, based on detecting that the data source has been added to a computing platform, the method adds the new adapter to the adapter pool, and automatically selects the new adapter from the adapter pool to use for collecting the service management information from the added data source.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are facilities to intelligently select and generate new data adapters to collect desired service management information for a computing platform, such as a cloud service platform, and assist in service management, for instance cloud service management. As noted, current approaches leverage separate tools and/or systems, example of which include Zabbix (offered by Zabbix LLC), solutions from ITM (IBM Tivoli Monitoring, offered by International Business Machines Corporation), and Nagios (offered by Nagios Enterprises, LLC), to obtain this information, which leaves the cloud platform administrator to install, configure, and maintain the different tools.

Figure 1:
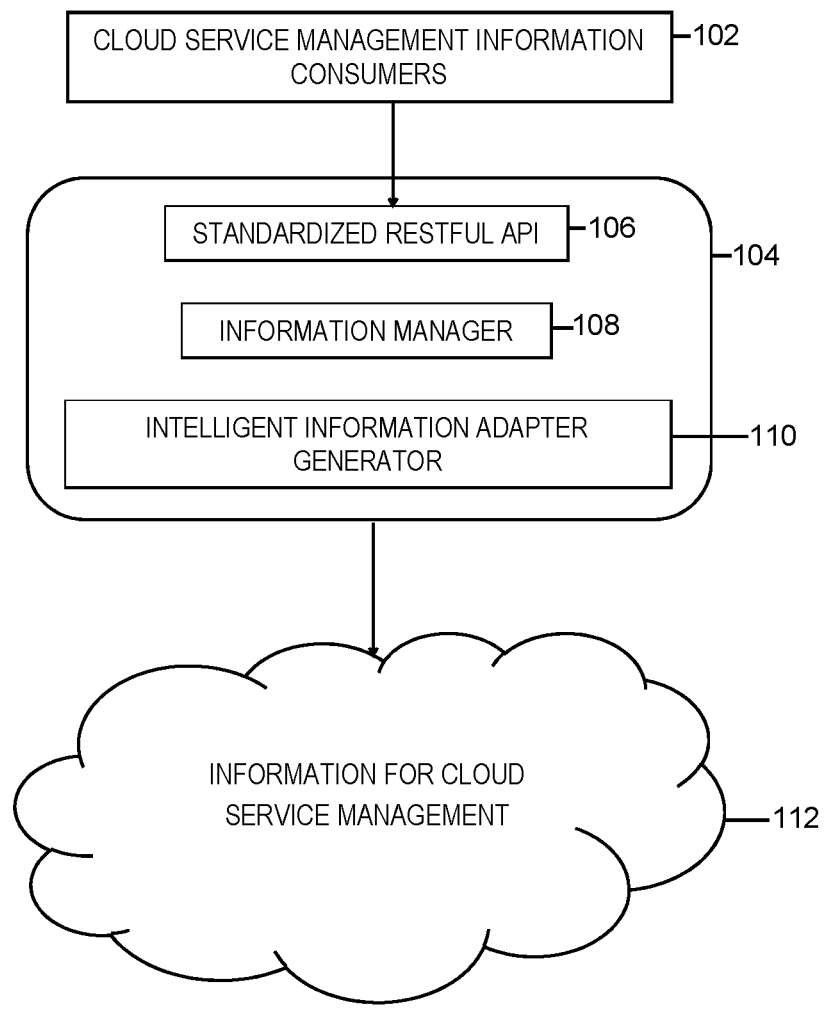
FIG. 1 illustrates an example information hierarchy incorporating aspects described herein.

FIG. 1 illustrates an example information hierarchy incorporating aspects described herein. Cloud service management information consumers 102 (by way of client computer systems, for instance) access components of a host computer system 104, particularly an information manager 108 through a Representational state transfer (REST) application programming interface (API) 106 of the host system 104. The information manager 108 leverages an intelligent information adapter generator 110 to select the appropriate adapter, among other tasks, to access the cloud service management information. The intelligent information adapter generator 110 includes self-adaption manager, adapter manager, adapter generator, and information collector components described herein. The intelligent information adapter generator 110 reaches out to the cloud components of the cloud platform 112, particularly data sources, to obtain the service management information for cloud service management. Service management information includes any type of information related to the cloud platform, such as facility-level, hardware-level, hypervisor-level, operating system-level, middleware-level, and/or application-level information, as examples. Though components 106, 108, 110 are shown to be included in a single host computer system 104, which may be hosted on the cloud platform 112 itself or elsewhere, these components could be distributed anywhere desired, including remote from each other if desired. Furthermore, it is understood that components of FIG. 1 may be in data communication with each other over wired and/or wireless communications links, which may traverse one or more networks, such as one or more local area networks, and/or one or more wide area networks, such as the internet.

Figure 2:
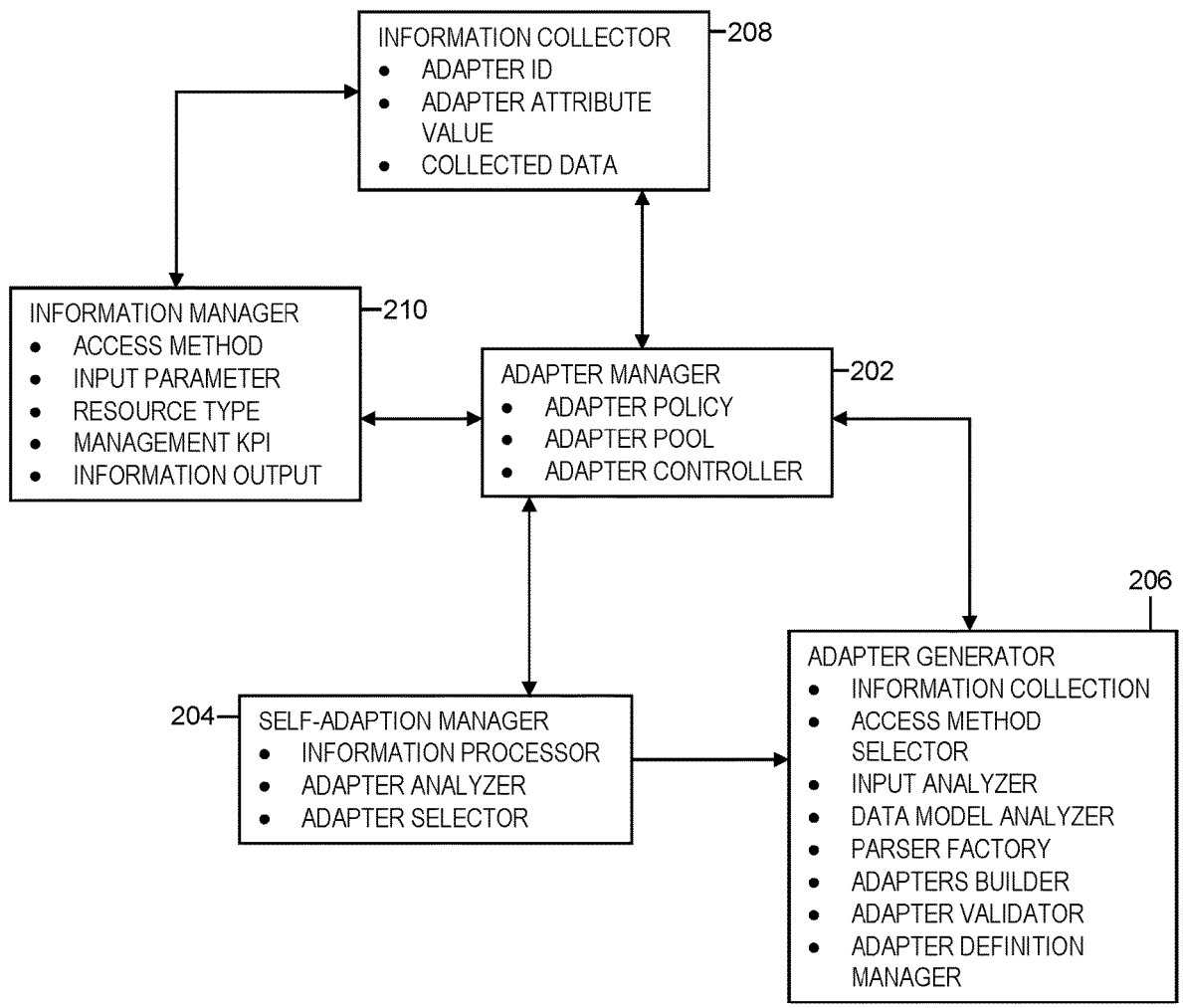
FIG. 2 depicts an example relational diagram between components described herein for service management information collection, in accordance with aspects described herein.

FIG. 2 depicts an example relational diagram between components described herein for service management information collection, in accordance with aspects described herein. An adapter manager 202 includes adapter policy, adapter pool, and adapter controller components, and provides the overall control for self-adaption manager 204 and adapter generator 206 components. The adapter pool is a pool of adapters. The adapter policy describes, manages, and organizes those adapters. An example policy may assign adapters different weights to the adapter. The adapter manager 202 can make a selection, from the adapter pool, of an adapter for collecting particular service management information, based on some criteria, in the adapter policy, for the adapter. The adapter controller is in charge of the adapter selection and interfacing (input/output) with other components such as the self-adaption manager 204.

The information collector 208 collects information from the various adapters in use, which are specified by adapter identifier (ID) and adapter attribute values. The adapter ID is the identification for the adapter from the adapter manager. Collected data is the result of the information collector collecting information using a given adapter.

The information manager 210 receives the information from the information collector. This is the component with which a cloud platform administrator or other cloud service management information consumer/user could interact (see FIG. 1) for information output. The access method, input parameter, resource type, and management key performance indicator (KPI) are components of a data model described herein.

The self-adaption manager 204 is to intelligently analyze a newly added data source and select the best or optimal adapter for that data source. If no proper adapter is found, a call is made to the adapter generator 206 to create new adapter as described herein.

Figure 3:
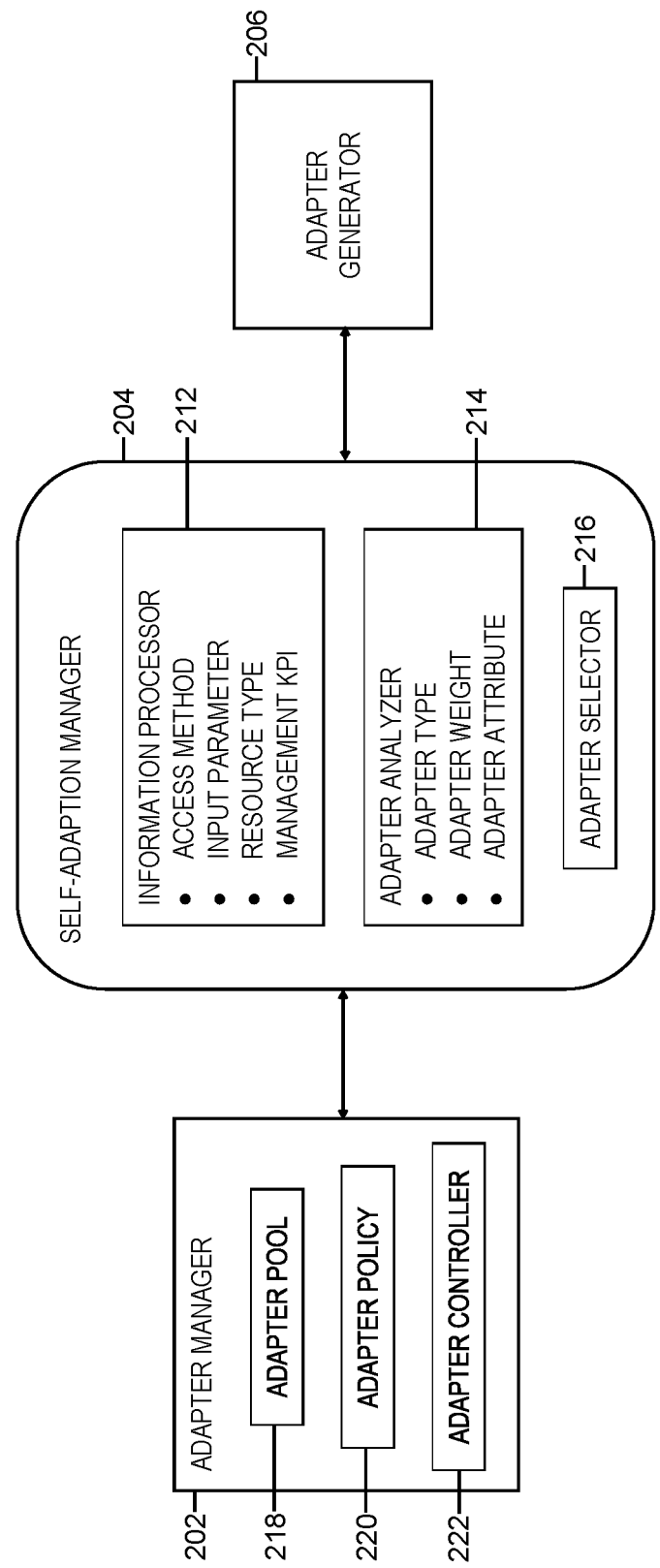
FIG. 3 illustrates further details of the self-adaption manager and related components, in accordance with aspects described herein.

FIG. 3 illustrates further details of the self-adaption manager and related components, in accordance with aspects described herein. As noted, the self-adaption manager 204 is used to intelligently analyze related input information, such as information including or indicating the access method, input parameter, resource type, and management KPI of a data source and choose an adapter to use for collecting and parsing the service management information provided by the data source. The preceding four items are components of an adapter data model, described herein with reference to FIG. 4. An information processor 212 of the self-adaption manager 204 is to obtain related information as input from an end user, for instance. An adapter analyzer 214 analyzes the access method, input parameter, resource type, and management KPI and sends a result to an adapter selector 216, which selects the optimum adapter from the adapter manager 202. The adapter analyzer 214 considers an adapter type indicated in adapter analyzer information. The adapter type is handled by the adapter pool 218 of the adapter manager 202 component. When the system registers an adapter to the adapter pool 218, an adapter type is indicated (for instance processor, disk, or network type, indicating in these examples the type of hardware component that the adapter is to obtain information from). The adapter policy 220 describes, manages, and organizes those adapters and the adapter controller 222 facilitates adapter selection and interfacing (input/output) with other components.

If appropriate adapter(s) exist to collect and parse the information from an added data source, then the adapter selector 216 can select the optimal adapter. The determination of the optimal adapter may be made based on any of various considerations. Typically, an adapter will have attributes and an adapter weight, and the system uses the attribute information to choose the best one. For example, one adapter might focus on a particular performance indicator for processor speed while another adapter focuses a different performance indicator for disk performance. Additionally or alternatively, adapter weights may be used to weight or prioritize selection between adapters, for instance when multiple adapters would work.

If the adapter selector 216 cannot find an appropriate adapter to use, the selector 216 or self-adaption manager 204 can call the adapter generator 206 to create a new adapter, automatically in some embodiments, based on related input information.

Figure 4:
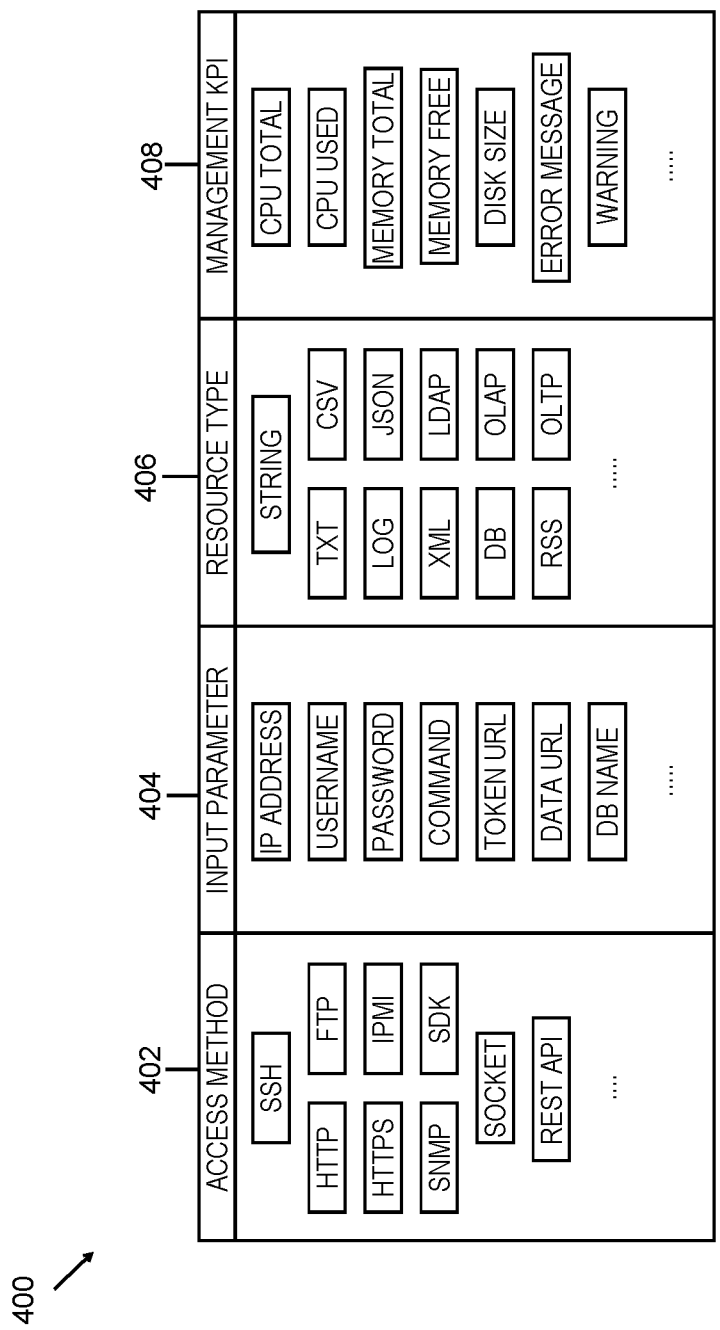
FIG. 4 depicts an example adapter data model to describe adapters, in accordance with aspects described herein.

FIG. 4 depicts an example adapter data model to describe adapters, in accordance with aspects described herein. The data model 400 includes four primary aspects categorized as access method 402, input parameter(s) 404, resource type 406, and performance indicator(s) 408. The adapter generator generates related adapters based on this data model. Each adapter has associated therewith an access method, one or more input parameters, a resource type, and one or more performance indicators.

The access method 402 defines the approach to connect to the target resource (data source). New access methods in the model 400 can be added for new access methods by adding the name of the access method and the code of the access method to access the resource. Example access methods include SSH, HTTP, FTP, HTTPS, IPMI, SNMP, SDK, Socket, and Rest API, though many others are possible.

The input parameter(s) 404 are the values input from, e.g., an administrator, to access the resource. With these values, the system knows how to connect to the target resource to obtain the information. Example input parameters include IP address, Username, Password, Command, Token URL, Data URL, and Database Name, though many others are possible.

The resource type 406 describes the type of source data that will be collected by the information collector based on a data rule. It defines the data structure obtained from the target resource. From this, the system knows how to parse the collected data to obtain the desired performance indicator(s). Example resource types include String, TXT, CSV, LOG, JSON, XML, LDAP, DB, OLAP, RSS, and OLTP, though many others are possible.

The performance indicator(s) 408 define the value(s) returned from the target resources so the system knows what type of data is being collected. Examples include CPU total, CPU used, Memory total, Memory free, Disk size, Error message, and Warning, though many others are possible.

The following is an example model or template of an adapter having access method=SSH, Input Parameters={IP address, Username, Password, specified command}, Resource type=string, and performance indicators={memory total, memory free}.

```
{
        "ID": 102,
        "Name": "SSH_Linux_Str_Mem",
        "Access_Method": "SSH",
        "Input_Parameter":
    [ "IP Address",
        "User Name",
        "Password",
        "Command"],
    "Resource_Type": "String",
    "Management_KPI":
    [ "Memory Total",
        "Memory Free"],
    }
```

The following is an example adapter instance from the above example model/template:

```
{
        "Instance ID": 3002,
        "Adapter ID": 102,
        "Name": "SSH_Linux_Str_Mem_001",
        "Access_Method": "SSH",
        "Input_Parameter":
    [ "IP Address": "10.111.10.100",
        "User Name": "root",
        "Password": "**** ****",
        "Command": "free -m |grep Mem|awk '{print $2,$3}'"],
    "Resource_Type": "String",
    "Management_KPI":
    [ "Memory Total",
        "Memory Free"]
    }
```

The example command provided as an input parameter is expected to produce an output, for instance output of data values such as "7728 5589".

Figure 5:
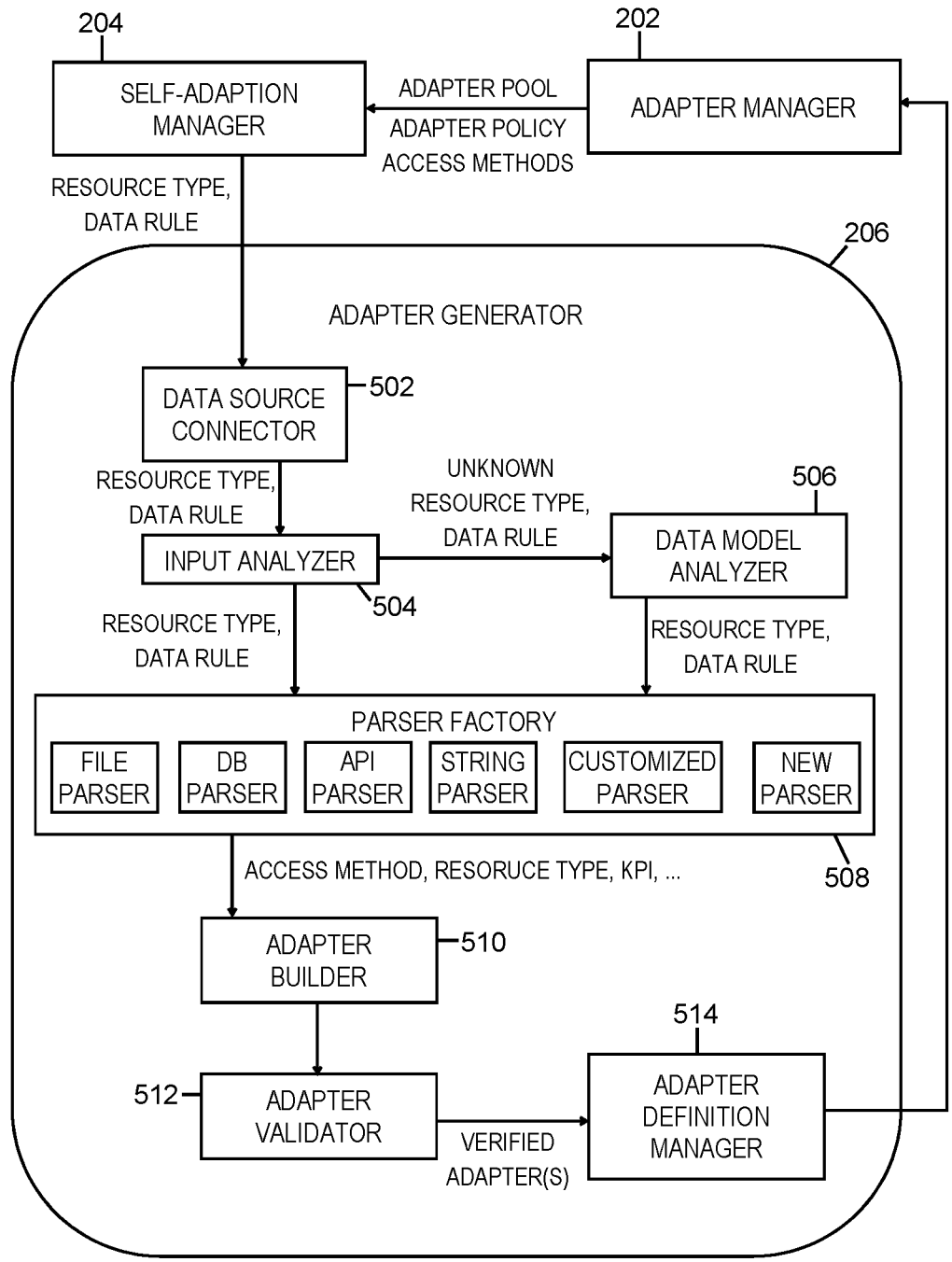
FIG. 5 depicts further details of an adapter generator, in accordance with aspects described herein.

FIG. 5 depicts further details of an adapter generator, in accordance with aspects described herein. Particularly, FIG. 5 shows aspects of a flow for the building of a new adapter. This process may be utilized when an adapter to use for an added data source has not been found. If existing adapter was identified as being workable for the data source, the self-adaption manager will have selected it.

Initially, a connection to the data source is made using the configuration information, such as IP address, username, password, access method, etc. This connection is made by a data source connector 502 of the adapter generator 206 based on receiving the configuration information from the self-adaption manager 204. The connection registers the data source. The self-adaption manager 204 passes the information down to data source connector 502, which connects to the data source by connecting and authenticating to it using the passed information. As part of the passed information in the example of FIG. 5, the self-adaption manager 204 passes a resource type, indicating the data structure expected from the source data, and a data rule, which refers to the rule embedded in the source data that the information collector component collects. The data rule of the source data is the rule that a data parser can use to parse the source data. Examples include a colon, semicolon, single quote, double quote, underline, blank, tag, bracket, or other customized symbol.

The resource type and data rule are passed to an input analyzer 504. If the resource type and data rule can be parsed by an existing parser, the input analyzer formats the data and directs the resource type and data rule to a parser factory 508. Otherwise, the resource type and/or data rule are unknown (insofar as being able to identify a parser to use) and the input analyzer 504 directs the unknown resource type and/or data rule to a data model analyzer 506. Thus, the input analyzer 504 analyzes input collected from the data source to be monitored. It receives the input and determines whether or not the resource type and data rule are known. If known, it provides this information to the parser factory 508 to find an appropriate parser to parse the information that will be collected from the data source. However, if the resource type and/or data rule are unknown, it means the system does not know how to parse the information that will be collected from the data source. In this latter regard, and as explained herein, the data model analyzer 506 can reach out to a knowledge platform, such as a big data platform or another tool, to assist with the analysis of data collected from the data source in order to learn how to parse that information. Once that is known, the parser factory 508 is leveraged to select (and potentially customize, if needed) an existing parser that is able to parse the information based on the now-recognizable resource type and/or data rule, or build a new parser.

The parser factory includes parsers of various types. A file parser can parse performance indicator data from various file types, such as .CSV, .TXT, .XML, .JSON, .RSS, Microsoft Excel (offered by Microsoft Corporation), and/or syslog file types, as examples. A database parser can parse performance indicator data from data of various database technologies, such as Microsoft SQL, SAP MaxDB (offered by SAP SE), MonetDB, Mondrian, Oracle, DB2, Sybase, and/or XBASE, as examples. An API parser can parse performance indicator data from third party applications and/or standard information protocols, such as Open ERP, HL7, YAML, and/or OLAP, as examples. A string parser can explain related string data, such as command-line data, and/or key-value data, as examples. An administrator or other user can also provide input to customize a parser to produce a customized parser. A customized parser may be a customized version of an existing parser known the parser factory 508. In a particular example, a customized parser is provided based on finding an existing parser to parse the information, but relying on user input to provide some information about parsing the information collected from the particular data source. In other words, the user input tailors the customized parser to the particular data source.

The data model analyzer 506 is used to analyze the unknown data source (with unknown resource type/data rule) through a knowledge platform, such as a big data platform and/or third party tools, to learn of the resource type and data rule of the data source. In particular, it learns how to parse the information collected from the data source. If the data model cannot be parsed by an existing parser, even with customization, then the process uses a parser creator (described below with reference to FIG. 6) to automatically build a new parser.

Whether the parser selected is an existing parser, a customized parser, or a new parser, an adapter builder 510 will build adapter(s) based on the adapter data model now that the proper parser exists. The result may be more than one adapter. An adapter validator 512 uses these adapter(s) to obtain performance indicator values, and uses a normal distribution and/or other mathematical method(s) to verify the availability of the performance indicator values that the admin/user desires to be collected from the data source. This process attempts to parse the data collected from the data source, isolate the desired information (performance indicators), and judge how accurate the parser and adapter are at doing so. The adapter definition manager 514 will select the best adapter that has been validated to be accurate, fully define the adapter with an ID, adapter name, adapter type, access method, resource type, performance indicators, etc. based on the adapter data model (FIG. 4), then add the adapter to the adapter pool managed by adapter manager 202.

Figure 6:
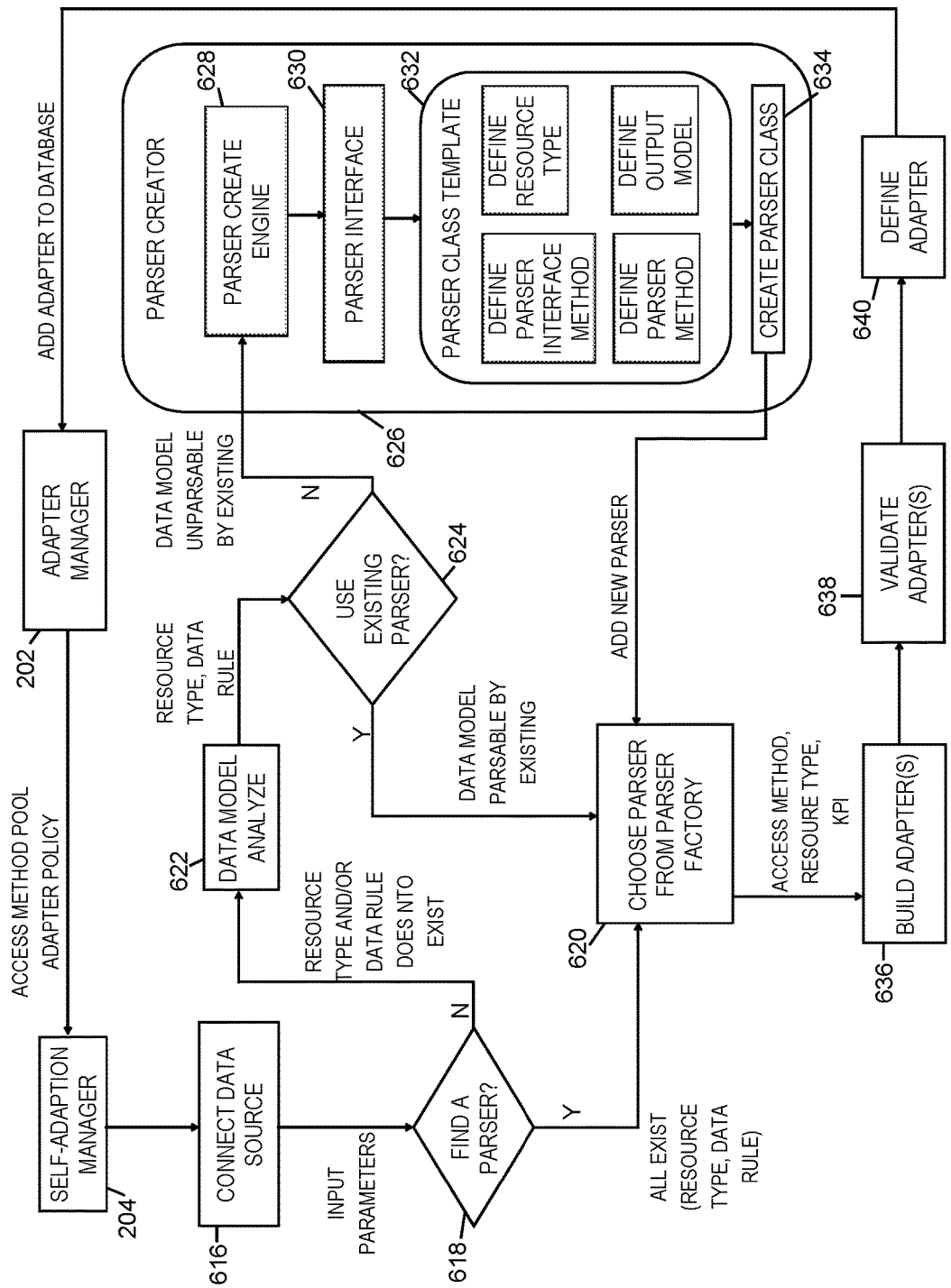
FIG. 6 depicts an example process for creating an adapter, in accordance with aspects described herein.

FIG. 6 depicts an example process for creating an adapter, in accordance with aspects described herein. The process is performed by a computer system, for example, based on an administrator or other user adding a data source from which to collect service management information for a computing platform, such as a cloud service platform. The process commences with the self-adaption manager 204 supplying the access method (e.g. ftp), resource type (e.g. file, for instance .log file), and data rule as, e.g., {error: content}, as well as the IP address, username, and password for connecting to the data source. It is noted that the data rule indicates that a colon is used to separate an error indication from the error content. The performance indicator may be the 'content' portion following the colon, in the collected data from that data source, in an example.

The process proceeds by connecting (616) to the data source to obtain input parameters for identifying a compatible parser, if it exists. A determination (618) determines based on the input whether at least one parser is found in the parser factory. If so, the user appoints a parser or provides the proper customization for a customized parser, and the parser is selected (620).

If instead at (618) the process determines that no parser is found, e.g. because the resource type and/or data rule are not recognized, the process proceeds with the functioning of the data model analyzer to analyze the data model (622), e.g. using the knowledge platform. The knowledge gained from the knowledge platform about the data model might actually inform of an existing appropriate parser to use, for instance because an existing parser recognizes the data rule for that resource type. The process checks the data result of the analysis and whether the data model can be parsed by an existing parser (624). If so, the process proceeds to 620 to select a parser from the parser factory.

If instead at 624 it is determined that no existing parser will work, the process proceeds by invoking the parser creator 626 to build a new parser. The parser creator 626 uses a parser create engine 628 to load a parser interface 630 and parser class template 632. The parser interface 630 is, in one embodiment, at type of Jabber object/class. The parser class template defines a parser interface method, resource type, parser method and output model automatically. A Java (for instance) interface class is an object in the Java programming language. The parser interface is a Java interface class and the parser interface method refers to a member of variables in this Java class. The parser method is a Java (in this example) function to implement a method in parser interface. The output model is a data object model that is applicable to the parser class, containing the class member variables, implementation methods, etc. This informs about the data type, how to obtain the data, etc. The information gained from the knowledge platform may be used in this regard to provide the data type and data model that can be recognized, e.g. by informing of the resource type and data rule need to create the proper parser.

As a result, a parser class is created (634) to produce the new parser in the parser factory, which is selected (620) to obtain the performance indicator(s) from the new data source.

Upon selecting (620) the parser from the parser factory, the process builds the adapter(s) (636) using the access method, resource type, etc., validates one of more of those adapter(s) (638) and defines an adapter (640) to add to the adapter manager (202), as described above.

Accordingly, upon the addition of a data source from which service management information is to be collected, and if an existing adapter is not suitable, aspects described herein create a new adapter based on input information through an adapter generator. The adapter generator automatically creates a new adapter based on the input information through the adapter generator by using access method, input parameter, data source type, and performance indicator, as part of a data model. For the added data source, if an appropriate parser is not found to parse the information from the data source, a parser creator can automatically generate a new parser based on analyzing the data collected from the data source.

Aspects provide for self-adaption based on adding of data sources, in which a cloud service provider can obtain desired information through a self-adaption manager to integrate different tools and/or systems to support cloud management service requirements. Furthermore, for an added data source, aspects can intelligently generate a new information adapter, enabling the cloud service provider to easily obtain and integrate information for cloud service management and ultimate deliver better quality service to its customers.

Aspects described herein do not rely on converting data format types used by different software applications, instead intelligently collecting the desired information through flexible adapter generation, automatically in some embodiments, for different target resources. In addition, aspects described herein are agentless in that they do not rely on an agent to be installed on the data source, instead using an adapter concept to collect information directly from the data sources in their native format.

Figure 7:
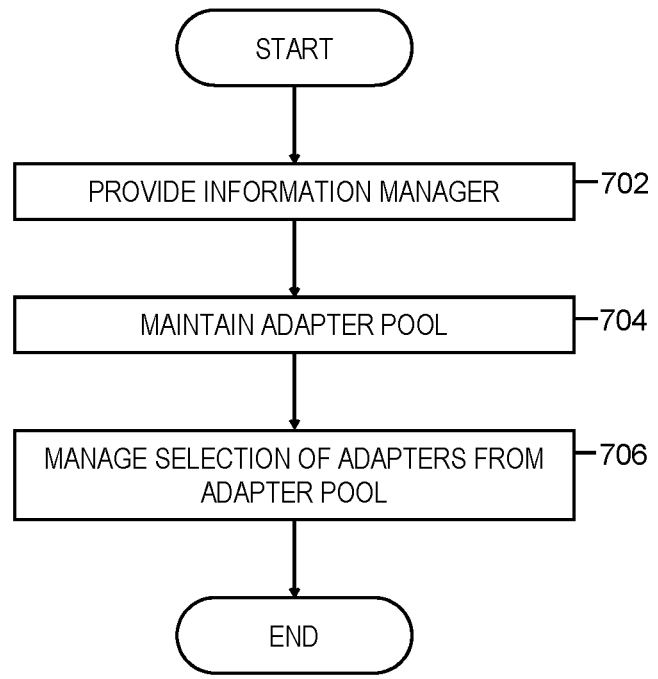
FIG. 7 depicts an example process for intelligent integration of service management information for a computing platform, in accordance with aspects described herein.

FIG. 7 depicts an example process for intelligent integration of service management information for a computing platform, such as a cloud service platform, in accordance with aspects described herein. In some examples, the process is performed by one or more computer systems, such as those described herein, which may include one or more computer systems in communication with devices of a cloud service platform and with which an information consumer interacts, and/or one of more other computer systems.

The process begins by providing an information manager for exposing service management information for a computing platform, e.g. a cloud service platform, to a user (702). The service management information may be provided by one or more data sources of the computing platform. The process proceeds by maintaining an adapter pool of adapters configured for collecting and parsing the service management information (704). Additionally, the process manages selection of adapters from the adapter pool to use for collecting the service management information (706).

Managing the selection of adapters includes, based on adding a data source to the one or more data sources from which to collect the service management information, automatically selecting an adapter to use for collecting service management information from that added data source. Part of this selection of an appropriate adapter can include automatically creating and selecting a new adapter, where the new adapter is created based on access information to access the added data source, a resource type of the portion of service management information collected from the added data source, and a desired performance indicator that the new adapter is to parse out from the portion of service management information that the new adapter collects. Access information can include an access method to connect to the added data source and parameters to use for connecting to the added data source. Additionally or alternatively, the resource type can include a type of data structure of data received from the added data source.

Figure 8:
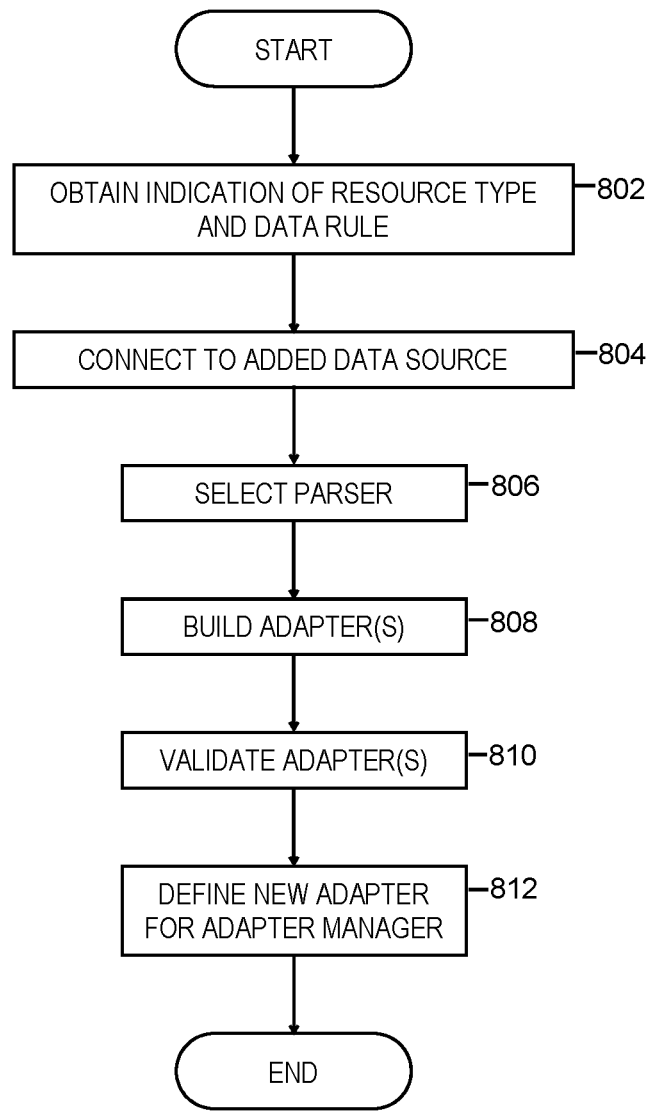
FIG. 8 depicts an example process for creating a new adapter, in accordance with aspects described herein.

FIG. 8 depicts an example process for creating a new adapter, in accordance with aspects described herein. The process is performed by one or more computer systems, such as those described herein. The process begins by obtaining an indication of the resource type and a data rule for the added data source (802). This may be provided by an administrator or other user, for example. The process then connects to the added data source using the access information (804). The process then selects a parser to parse the resource type based on the data rule (806). An example such process is described below with reference to FIG. 9.

Referring still to the process of FIG. 8, the process then builds new adapter(s) to use the selected parser (808). In this regard, it may build a plurality of candidate new adapters to use the selected parser, where the adapter to be selected as the new adapter to use for the added data source is one of these candidate new adapters. The process of FIG. 8 continues by validating performance of each candidate new adapter of the plurality of candidate new adapters (810). This is done by, for each candidate new adapter, using it to attempt to parse out the desired performance indicator from the at least some service management information collected from the added data source, and assessing results of the attempt to parse out the desired performance indicator. The validating may find that some adapters are not valid, i.e. they did not pass the validation. Just, the validation (810) may produce adapter(s) that are validated and adapter(s) that are not validated. The selected new adapter to use for the added data source is to be selected from the plurality of candidate new adapters based on the validating performance, for instance, the selected new adapter is selected as being best of the plurality of candidate new adapters at parsing out the desired performance indicator, as gleaned from the validation.

Based on validating performance of the new adapter, the process then defines the new adapter for an adapter manager (812) and adds the new adapter to the adapter pool. The selection of the new adapter selects the new adapter from the adapter pool.

Figure 9:
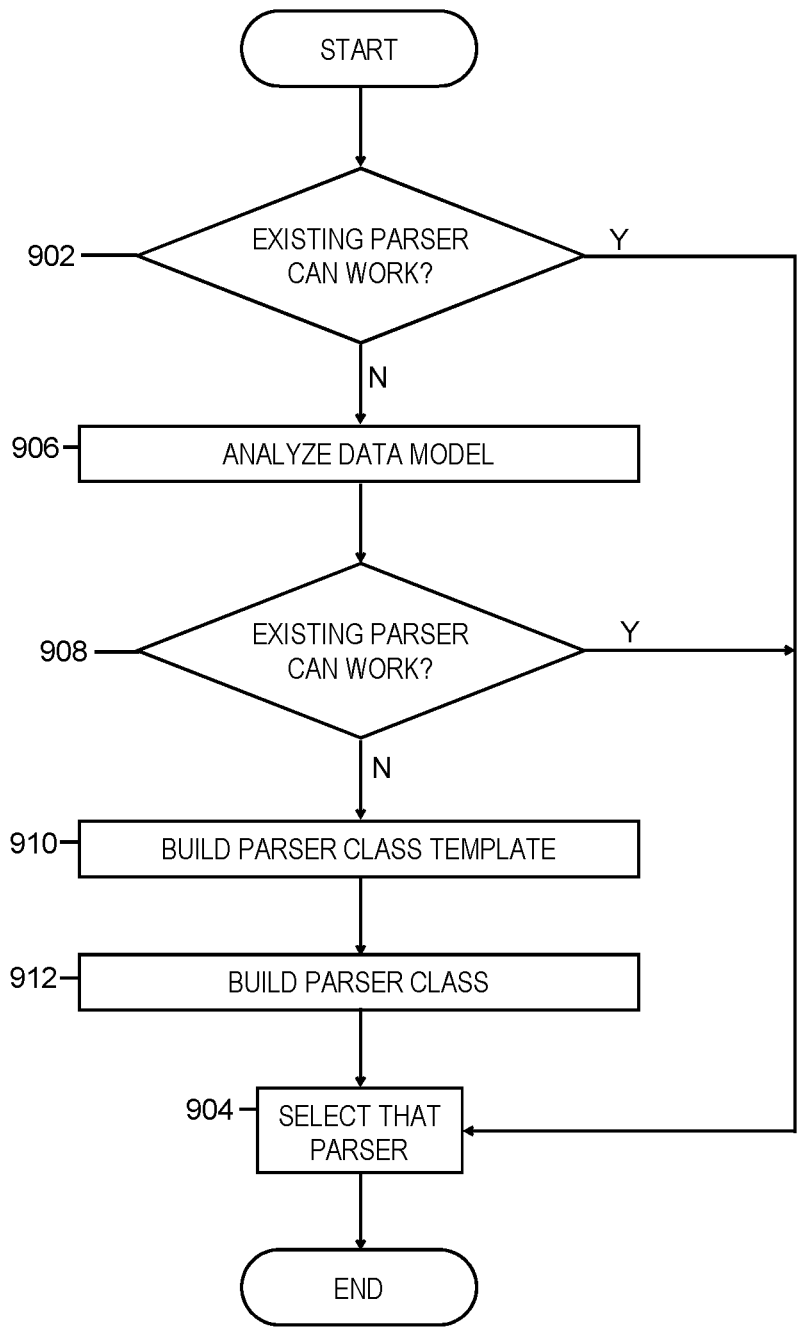
FIG. 9 depicts an example process for selecting a parser, in accordance with aspects described herein.

FIG. 9 depicts an example process for selecting a parser, in accordance with aspects described herein. The process begins with a determination whether an existing parser can work (902), e.g. determining whether any existing parser of a parser collection of existing parser(s) is configured to parse the resource type and data rule initially indicated. If an existing parser of the parser collection is configured to parse the resource type and data rule, then the process selects that existing parser (904) and ends. Consequently, the creation of the new adapter includes creating the new adapter to use that existing parser to parse out the desired performance indicator. In some embodiments, a user can customize an existing parser to work for the added data source. Based on a user customizing an existing parser to provide a customized parser, by providing information about parsing the portion of the service management information from the added data source, the selection of the parser in that case selects the customized parser. Hence, the creation of the new adapter in that case includes creating the new adapter to use the customized parser to parse out the desired performance indicator.

If, however, at (902) it was determined that no existing parser of the parser collection is configured to parse out the desired performance indicator, the resource type and/or data rule may be unknown. The process proceeds by analyzing the data model (906), for instance as returned from the data source. The analysis may use a knowledge platform to help identify the resource type and/or data rule, as the case may be. The process again determines whether an existing parser can work (908) given the updated information about the resource type and/or data rule. If the process identifies an existing parser as being configured to parse the resource type based on the data rule, the process proceeds by selecting that workable parser (904), perhaps with customization to provide a customized parser that would work.

Otherwise, if no existing parser works even with the updated information about the resource type/data rule, then the process continues by building a new parser. Specifically, the process builds a parser class template (910) defining a parser interface method, a resource type, a parser method, and an output model for the new parser, and builds a parser class for the new parser from the parser class template (912). The process then selects the newly created parser (904). The creation of the new adapter includes in this case creating the new adapter to use the new parser to parse out the desired performance indicator using the built parser class.

Although various examples are provided, variations are possible without departing from a spirit of the claimed aspects.

Figure 10:
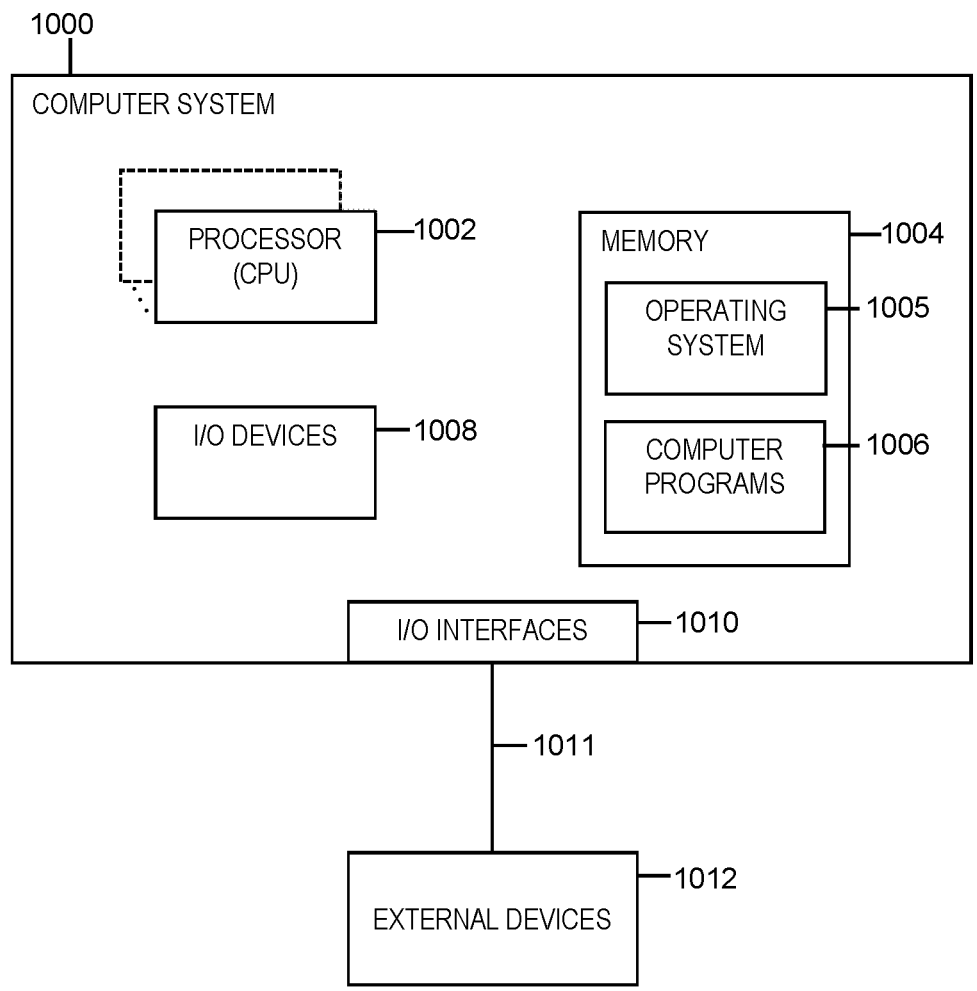
FIG. 10 depicts one example of a computer system and associated devices to incorporate and/or use aspects described herein.

Processes described herein may be performed singly or collectively by one or more computer systems. FIG. 10 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 10 shows a computer system 1000 in communication with external device(s) 1012. Computer system 1000 includes one or more processor(s) 1002, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1002 can also include register(s) to be used by one or more of the functional components. Computer system 1000 also includes memory 1004, input/output (I/O) devices 1008, and I/O interfaces 1010, which may be coupled to processor(s) 1002 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1004 can be or include main or system memory (e.g. Random Access Memory) used in the execution of program instructions, storage device(s) such as hard drive(s), flash media, or optical media as examples, and/or cache memory, as examples. Memory 1004 can include, for instance, a cache, such as a shared cache, which may be coupled to local caches (examples include L1 cache, L2 cache, etc.) of processor(s) 1002. Additionally, memory 1004 may be or include at least one computer program product having a set (e.g., at least one) of program modules, instructions, code or the like that is/are configured to carry out functions of embodiments described herein when executed by one or more processors.

Memory 1004 can store an operating system 1005 and other computer programs 1006, such as one or more computer programs/applications that execute to perform aspects described herein. Specifically, programs/applications can include computer readable program instructions that may be configured to carry out functions of embodiments of aspects described herein.

Examples of I/O devices 1008 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1012) coupled to the computer system through one or more I/O interfaces 1010.

Computer system 1000 may communicate with one or more external devices 1012 via one or more I/O interfaces 1010. Example external devices include a keyboard, a pointing device, a display, and/or any other devices that enable a user to interact with computer system 1000. Other example external devices include any device that enables computer system 1000 to communicate with one or more other computing systems or peripheral devices such as a printer. A network interface/adapter is an example I/O interface that enables computer system 1000 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 1010 and external devices 1012 can occur across wired and/or wireless communications link(s) 1011, such as Ethernet-based wired or wireless connections. Example wireless connections include cellular, Wi-Fi, Bluetooth®, proximity-based, near-field, or other types of wireless connections. More generally, communications link(s) 1011 may be any appropriate wireless and/or wired communication link(s) for communicating data.

Particular external device(s) 1012 may include one or more data storage devices, which may store one or more programs, one or more computer readable program instructions, and/or data, etc. Computer system 1000 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1000 may be operational with numerous other general purpose or special purpose computing system environments or configurations. Computer system 1000 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 11.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 11:
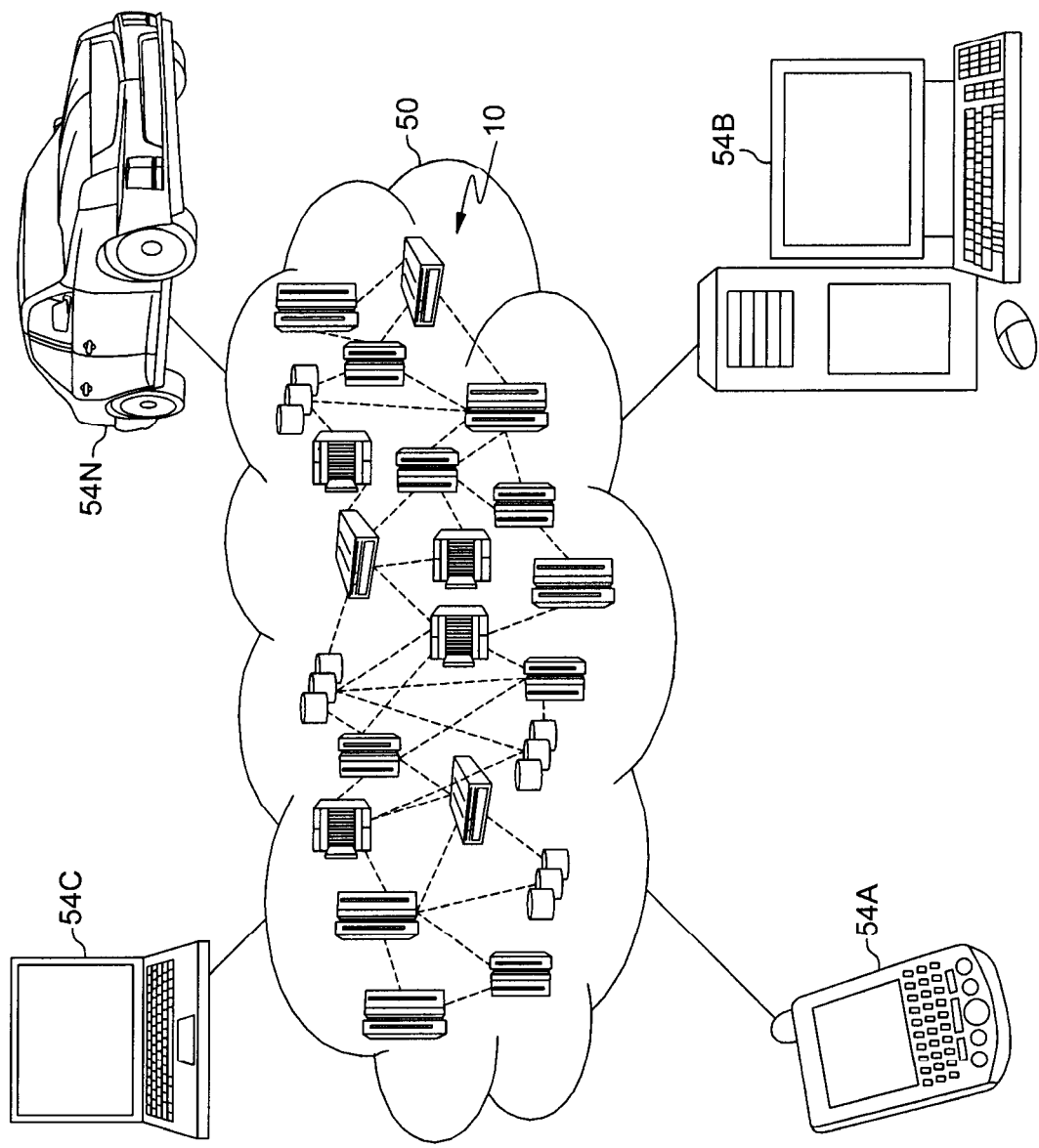
FIG. 11 depicts a cloud computing environment according to an embodiment of the present invention.

Referring now to FIG. 11, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
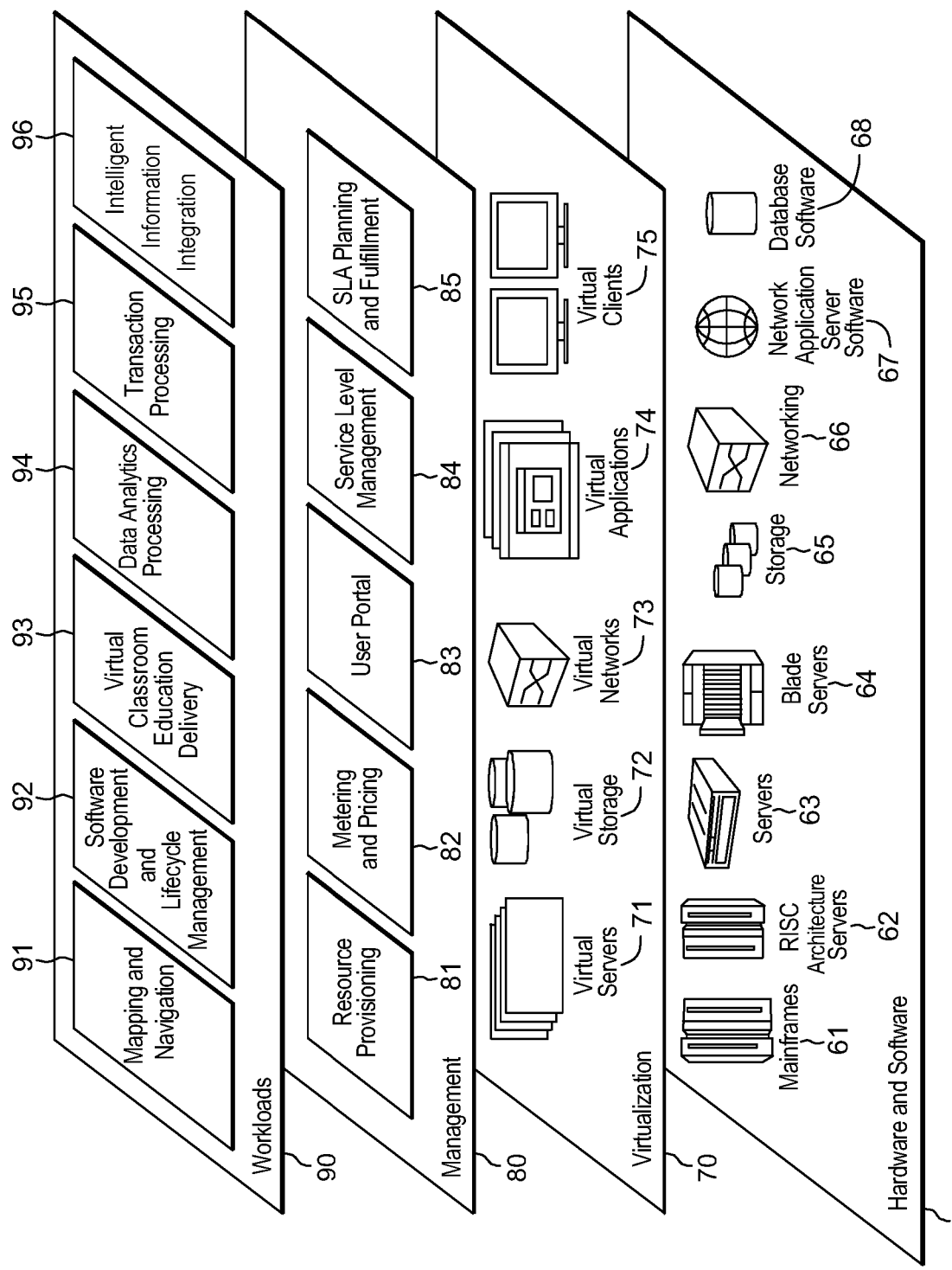
FIG. 12 depicts abstraction model layers according to an embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent information integration 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   maintaining an adapter pool of adapters configured for collecting and parsing service management information provided by data sources; and
   based on detecting that a data source has been added to a computing platform, performing:
      creating a new adapter based on access information to access the added data source, a resource type of the service management information to collect from the added data source, and a desired indicator that the new adapter is to parse out from the service management information collected from the added data source;
      adding the new adapter to the adapter pool; and
      automatically selecting the new adapter from the adapter pool to use for collecting the service management information from the added data source.

2. The method of claim 1, wherein the access information comprises an access method to connect to the added data source and parameters to use for connecting to the added data source, and the resource type comprises a type of data structure of data received from the added data source.

3. The method of claim 1, wherein the creating the new adapter comprises:
   obtaining an indication of the resource type and a data rule for the added data source;
   connecting to the added data source using the access information; and
   selecting a parser to parse the resource type based on the data rule, the selecting the parser comprising determining whether any existing parser of a parser collection of one or more existing parsers is configured to parse the resource type and data rule.

4. The method of claim 3, wherein based on determining that an existing parser of the parser collection is configured to parse the resource type and data rule, the automatically selecting selects the existing parser and the creating the new adapter comprises creating the new adapter to use the existing parser to parse out the desired indicator.

5. The method of claim 4, wherein the resource type or data rule is initially unknown, and wherein the creating further comprises:
   analyzing, using a knowledge platform, data returned from the added data source to identify the resource type and data rule; and
   identifying the existing parser as being configured to parse the resource type based on the data rule.

6. The method of claim 3, wherein based on a user customizing an existing parser to provide a customized parser, by providing information about parsing the service management information from the added data source, the selecting the parser selects the customized parser and the creating the new adapter comprises creating the new adapter to use the customized parser to parse out the desired indicator.

7. The method of claim 3, wherein based on determining that no existing parser of the parser collection is configured to parse out the desired indicator, the selecting the parser comprises building a new parser, the building the new parser comprising:
building a parser class template defining a parser interface method, a resource type, a parser method, and an output model for the new parser; and
building a parser class for the new parser from the parser class template, wherein the creating the new adapter comprises creating the new adapter to use the new parser to parse out the desired indicator using the built parser class.

8. The method of claim 3, wherein the creating the new adapter further comprises:
building the new adapter to use the selected parser; and
validating performance of the new adapter, the validating comprising using the built new adapter to attempt to parse out the desired indicator from at least some service management information collected from the added data source, and assessing results of the attempt to parse out the desired indicator.

9. The method of claim 8, wherein the creating further comprises:
building a plurality of candidate new adapters to use the selected parser, the selected new adapter being one of the plurality of candidate new adapters; and
validating performance of each candidate new adapter of the plurality of candidate new adapters by using the respective candidate new adapter to attempt to parse out the desired indicator from the at least some service management information collected from the added data source, and assessing results of the attempt to parse out the desired indicator, wherein the selected new adapter is selected from the plurality of candidate new adapters based on the validating performance, and wherein the selected new adapter is selected as being best of the plurality of candidate new adapters at parsing out the desired indicator.

10. The method of claim 8, wherein the creating the new adapter further comprises, based on validating performance of the new adapter, defining the new adapter for an adapter manager and adding the new adapter to the adapter pool, wherein the automatically selecting the new adapter selects the new adapter from the adapter pool.

11. A computer system comprising:
a memory; and
a processor in communication with the memory, wherein the computer system is configured to perform a method comprising:
maintaining an adapter pool of adapters configured for collecting and parsing service management information provided by data sources; and
based on detecting that a data source has been added to a computing platform, performing:
creating a new adapter based on access information to access the added data source, a resource type of the service management information to collect from the added data source, and a desired indicator that the new adapter is to parse out from the service management information collected from the added data source;
adding the new adapter to the adapter pool; and
automatically selecting the new adapter from the adapter pool to use for collecting the service management information from the added data source.

12. The computer system of claim 11, wherein the creating the new adapter comprises:
obtaining an indication of the resource type and a data rule for the added data source;
connecting to the added data source using the access information; and
selecting a parser to parse the resource type based on the data rule, the selecting the parser comprising determining whether any existing parser of a parser collection of one or more existing parsers is configured to parse the resource type and data rule.

13. The computer system of claim 12, wherein based on determining that an existing parser of the parser collection is configured to parse the resource type and data rule, the automatically selecting selects the existing parser and the creating the new adapter comprises creating the new adapter to use the existing parser to parse out the desired indicator.

14. The computer system of claim 13, wherein the resource type or data rule is initially unknown, and wherein the creating further comprises:
analyzing, using a knowledge platform, data returned from the added data source to identify the resource type and data rule; and
identifying the existing parser as being configured to parse the resource type based on the data rule.

15. The computer system of claim 12, wherein based on a user customizing an existing parser to provide a customized parser, by providing information about parsing the service management information from the added data source, the selecting the parser selects the customized parser and the creating the new adapter comprises creating the new adapter to use the customized parser to parse out the desired indicator.

16. The computer system of claim 12, wherein based on determining that no existing parser of the parser collection is configured to parse out the desired indicator, the selecting the parser comprises building a new parser, the building the new parser comprising:
building a parser class template defining a parser interface method, a resource type, a parser method, and an output model for the new parser; and
building a parser class for the new parser from the parser class template, wherein the creating the new adapter comprises creating the new adapter to use the new parser to parse out the desired indicator using the built parser class.

17. A computer program product comprising:
a non-transitory computer readable storage medium readable by a processing circuit and storing instructions for execution by the processing circuit for performing a method comprising:
maintaining an adapter pool of adapters configured for collecting and parsing service management information provided by data sources; and
based on detecting that a data source has been added to a computing platform, performing:
creating a new adapter based on access information to access the added data source, a resource type of the service management information to collect from the added data source, and a desired indicator that the new adapter is to parse out from the service management information collected from the added data source;

adding the new adapter to the adapter pool; and automatically selecting the new adapter from the adapter pool to use for collecting the service management information from the added data source.

18. The computer program product of claim 17, wherein the creating the new adapter comprises:

obtaining an indication of the resource type and a data rule for the added data source;

connecting to the added data source using the access information; and selecting a parser to parse the resource type based on the data rule, the selecting the parser comprising determining whether any existing parser of a parser collection of one or more existing parsers is configured to parse the resource type and data rule.

19. The computer program product of claim 18, wherein the resource type or data rule is initially unknown, and wherein the creating further comprises:

analyzing, using a knowledge platform, data returned from the added data source to identify the resource type and data rule; and identifying the existing parser as being configured to parse the resource type based on the data rule, wherein based on determining that an existing parser of the parser collection is configured to parse the resource type and data rule, the automatically selecting selects the existing parser and the creating the new adapter comprises creating the new adapter to use the existing parser to parse out the desired indicator.

20. The computer program product of claim 18, wherein based on determining that no existing parser of the parser collection is configured to parse out the desired indicator, the selecting the parser comprises building a new parser, the building the new parser comprising:

building a parser class template defining a parser interface method, a resource type, a parser method, and an output model for the new parser; and building a parser class for the new parser from the parser class template, wherein the creating the new adapter comprises creating the new adapter to use the new parser to parse out the desired indicator using the built parser class.

* * * * *